United States Patent
Wessman et al.

(10) Patent No.: US 9,156,113 B2
(45) Date of Patent: Oct. 13, 2015

(54) COMPONENTS AND PROCESSES OF PRODUCING COMPONENTS WITH REGIONS HAVING DIFFERENT GRAIN STRUCTURES

(75) Inventors: Andrew Ezekiel Wessman, Walton, KY (US); David Paul Mourer, Beverly, MA (US); Daniel Yeuching Wei, Reading, MA (US)

(73) Assignee: General Electric Company, Schenectady, NY (US)

( * ) Notice: Subject to any disclaimer, the term of this patent is extended or adjusted under 35 U.S.C. 154(b) by 642 days.

(21) Appl. No.: 13/152,898

(22) Filed: Jun. 3, 2011

(65) Prior Publication Data

US 2012/0305143 A1    Dec. 6, 2012

(51) Int. Cl.

| | |
|---|---|
| C22F 1/10 | (2006.01) |
| B23P 15/00 | (2006.01) |
| C21D 7/13 | (2006.01) |
| C21D 9/32 | (2006.01) |
| C21D 1/26 | (2006.01) |
| F01D 5/02 | (2006.01) |
| B21K 1/32 | (2006.01) |
| C22C 19/03 | (2006.01) |
| C21D 9/00 | (2006.01) |
| B32B 15/01 | (2006.01) |

(52) U.S. Cl.
CPC .................. *B23P 15/006* (2013.01); *B21K 1/32* (2013.01); *C21D 1/26* (2013.01); *C21D 7/13* (2013.01); *C21D 9/32* (2013.01); *C22C 19/03* (2013.01); *F01D 5/02* (2013.01); *C21D 2201/00* (2013.01); *F05D 2230/25* (2013.01)

(58) Field of Classification Search
CPC .......... B23P 15/006; B21K 1/32; C21D 7/13; C21D 9/32; C21D 1/26
USPC .......................................... 148/671, 677, 559
See application file for complete search history.

(56) References Cited

U.S. PATENT DOCUMENTS

| | | | |
|---|---|---|---|
| 3,576,681 | A | 4/1971 | Barker et al. |
| 4,608,094 | A | 8/1986 | Miller et al. |
| 4,820,358 | A | 4/1989 | Chang |
| 4,957,567 | A | 9/1990 | Krueger et al. |
| 5,100,050 | A | 3/1992 | Krueger et al. |
| 5,106,012 | A | 4/1992 | Hyzak et al. |

(Continued)

*Primary Examiner* — Rebecca Lee
(74) *Attorney, Agent, or Firm* — General Electric Company; Brian Overbeck

(57) ABSTRACT

Processes for fabricating components to have two or more regions with different grain structures, and components produced by such processes. The processes entail performing at least one forging step on a preform to produce a profile having at least a first portion corresponding to the first region of the component. The preform is formed of a precipitation-strengthened alloy having a solvus temperature, and the at least one forging step comprises a nonfinal forging step performed at a first strain rate and at a first subsolvus temperature that is below the solvus temperature of the alloy. A subsequent forging step is performed on the profile to produce a final profile comprising the first portion and a second portion corresponding to the second region of the component. The subsequent forging step is performed at a strain rate and at a subsequent subsolvus temperature, wherein at least one of the subsequent strain rate and subsequent subsolvus temperature is either higher or lower than the first strain rate or first subsolvus temperature. A heat treatment is then performed on the final profile to cause grain growth, wherein the first portion of the final profile has a different grain size than the second portion.

20 Claims, 3 Drawing Sheets

Pancake Forging

Web Forging    Rim Forging

(56) References Cited

U.S. PATENT DOCUMENTS

| | | |
|---|---|---|
| 5,161,950 A | 11/1992 | Krueger et al. |
| 5,312,497 A | 5/1994 | Mathey |
| 5,527,020 A | 6/1996 | Ganesh et al. |
| 5,527,402 A | 6/1996 | Ganesh et al. |
| 5,593,519 A | 1/1997 | Blankenship et al. |
| 5,649,280 A * | 7/1997 | Blankenship et al. .......... 419/25 |
| 6,059,904 A | 5/2000 | Benz et al. |
| 6,478,896 B1 | 11/2002 | Ganesh et al. |
| 6,521,175 B1 | 2/2003 | Mourer et al. |
| 6,939,419 B1 | 9/2005 | Utyashev et al. |
| 6,969,238 B2 | 11/2005 | Groh et al. |
| 2007/0169860 A1 | 7/2007 | Groh |
| 2008/0120842 A1 | 5/2008 | Wines et al. |
| 2008/0124210 A1 | 5/2008 | Wayte et al. |

* cited by examiner

COMPONENTS AND PROCESSES OF PRODUCING COMPONENTS WITH REGIONS HAVING DIFFERENT GRAIN STRUCTURES

BACKGROUND OF THE INVENTION

The present invention generally relates to processes for producing components having regions with different microstructures. More particularly, this invention is directed to a technique for producing components, as an example, rotating components of a turbomachine, by performing an incremental forging process on a preform to yield different microstructures within regions of the resulting component.

Components within the combustor and turbine sections of a gas turbine engine are often formed of superalloy materials in order to achieve acceptable mechanical properties while at elevated temperatures resulting from the hot combustion gases produced in the combustor. Higher compressor exit temperatures in modern high pressure ratio gas turbine engines can also necessitate the use of high performance superalloys for compressor components, including blades, spools, disks (wheels) and other components. Suitable alloy compositions and microstructures for a given component are dependent on the particular temperatures, stresses, and other conditions to which the component is subjected. For example, rotating hardware such as turbine disks and compressor spools and disks are typically formed of alloys that must undergo carefully controlled forging, heat treatments, and surface treatments to produce a controlled grain structure and desirable mechanical properties. Notable examples of alloys used in these applications include gamma prime ($\gamma'$) precipitation-strengthened nickel-base superalloys containing chromium, tungsten, molybdenum, rhenium and/or cobalt as principal elements that combine with nickel to form the gamma ($\gamma$) matrix, and contain aluminum, titanium, tantalum, niobium, and/or vanadium as principal elements that combine with nickel to form the gamma prime precipitate strengthening phase, principally $Ni_3(Al,Ti)$. Particular examples of gamma prime nickel-base superalloys include René 88DT (R88DT; U.S. Pat. No. 4,957,567), René 95 (R95; U.S. Pat. No. 3,576,681), and René 104 (R104; U.S. Pat. No. 6,521,175), as well as certain nickel-base superalloys commercially available under the trademarks Inconel®, Nimonic®, and Udimet®. Disks and other critical gas turbine engine components are often forged from billets produced by powder metallurgy (P/M), conventional cast and wrought processing, and spraycast or nucleated casting forming techniques. Forging is typically performed on billets have a fine-grained microstructure that promotes formability, after which a heat treatment is often performed to cause uniform grain growth (coarsening) to optimize properties. This heat treatment is performed at a supersolvus temperature, in other words, above the solvus temperature at which the gamma prime precipitates of the alloy enter into solid solution.

A turbine disk 10 of a type known in the art is represented in FIG. 1. The disk 10 generally includes an outer rim 12, a central hub or bore 14, and a web 16 between the rim 12 and bore 14. The rim 12 is configured for the attachment of turbine blades (not shown) in accordance with known practice. A bore hole 18 in the form of a through-hole is centrally located in the bore 14 for mounting the disk 10 on a shaft, and therefore the axis of the bore hole 18 coincides with the axis of rotation of the disk 10. The disk 10 is a unitary forging and representative of turbine disks used in aircraft engines, including but not limited to high-bypass gas turbine engines such as the GE900 and GEnx® commercial engines manufactured by the General Electric Company.

The bore 14 and web 16 of the turbine disk 10 (as well as those of compressor spools and disks) generally have lower operating temperatures than the rim 12. It is therefore permissible and often desirable that the bore 14 have different properties than the rim 12. Depending on the particular alloy or alloys used, optimal microstructures for the rim 12, bore 14 and web 16 can also differ. For example, a relatively fine grain size is often optimal for the bore 14 and web 16 to promote tensile strength, burst strength, and resistance to low cycle fatigue (LCF), while a coarser grain size is often optimal in the rim 12 to promote creep, stress-rupture, and crack growth resistance, for example, low dwell (hold-time) fatigue crack growth rates (DFCGR) at high temperatures. To satisfy these competing requirements, disks have been proposed that are formed of multiple alloys and/or have different microstructures within the rim and bore. For example, U.S. Pat. Nos. 4,820,358, 5,527,020, 5,527,402 and 6,478,896 disclose dual heat treatment techniques capable of producing single-piece, constant-composition disks having coarser grains within the rim and finer grains with the bore as a result of performing heat treatments at different temperatures on the rim and bore, thereby obtaining the different grain structures and resulting different properties.

Multiple alloy disks that have been investigated typically entail the fabrication of separate rim and bore portions formed of different alloys. The rim and bore portions are then joined together, such as by welding or another metallurgical joining process. One such example is known as forge-enhanced bonding which, as disclosed in U.S. Pat. Nos. 5,100,050, 5,106,012 and 5,161,950, entails simultaneously forging preforms of the rim and bore. During the forging operation, deformation of the preforms yields the rim and bore as well as results in metallurgical joining of the rim and bore. Another example is solid-state welding processes, which include inertia welding techniques of the types disclosed in U.S. Pat. No. 6,969,238 and U.S. Published Patent Application Nos. 2008/0120842 and 2008/0124210. Because the different alloys may have different solvus temperatures such that the alloys are not conducive to a common solution heat treatment cycle, inertia welding has been limited to joining solution heat treated rim and bore portions, which are then subjected to an aging cycle after the welding operation.

Forging temperatures, strain, and strain rates profiles and post-forging cooling rates have also been shown to influence grain sizes within single-piece, constant-composition disks formed of gamma prime nickel-base superalloys. For example, U.S. Pat. No. 5,593,519 discloses a forging technique capable of producing uniformly coarse grains by maintaining low strain rates (0.01 s$^{-1}$ or less) when forging at a supersolvus temperature, generally up to about 100° F. (about 55° C.) above the gamma-prime solvus temperature. Different grain sizes can be obtained in specific locations of a component by cooling the specific locations at different rates from the supersolvus forging temperature. As another example, U.S. Pat. No. 6,059,904 discloses a forging technique capable of producing uniformly fine grains by maintaining low strain rates (0.01 s$^{-1}$ or less) during at least a first forging step performed at a subsolvus temperature, generally as low as about 100° F. (about 55° C.) below the gamma-prime solvus temperature. This patent reports that different grain sizes can be obtained in specific locations of a component by utilizing the teachings of U.S. Pat. No. 5,593,519.

Even with the advancements outlined above, in practice current certified commercial flight turbine disks have only been produced as monolithic structures formed by a single alloy and processed to have a uniform microstructure whose grain size is necessarily a compromise between the creep, stress-rupture and DFCGR properties desired for the rim and the LCF and burst properties desired for the bore.

BRIEF DESCRIPTION OF THE INVENTION

The present invention provides processes for fabricating components to have two or more regions with different grain structures, and components produced by such processes. Nonlimiting examples include rotating components of turbomachines, including turbine disks of gas turbine engines.

According to a first aspect of the invention, a process entails fabricating a component having at least first and second regions with different grain structures. The process includes performing at least one forging step on a preform to produce a profile having at least a first portion corresponding to the first region of the component. The preform is formed of a precipitation-strengthened alloy having a solvus temperature at which precipitates of the alloy enter into solid solution, and the at least one forging step comprises a nonfinal forging step performed at a first strain rate and at a first subsolvus temperature that is below the solvus temperature of the alloy. A subsequent forging step is performed on the profile to produce a final profile comprising the first portion and a second portion corresponding to the second region of the component. The subsequent forging step is performed at a subsequent strain rate and at a subsequent subsolvus temperature, wherein at least one of the subsequent strain rate and subsequent subsolvus temperature is either higher or lower than the first strain rate or first subsolvus temperature. A heat treatment is then performed on the final profile to cause grain growth in the final profile, wherein the first portion of the final profile has a different grain size than the second portion as a result of the first strain rate being different than the subsequent strain rate and/or the first subsolvus temperature being different than the subsequent subsolvus temperature.

According to additional aspects of the invention, the preform is formed of a precipitation-strengthened nickel-base alloy having a solvus temperature at which gamma prime precipitates of the alloy enter into solid solution, and the component produced by steps described above can be a rotating component of a gas turbine engine having a bore and a rim with different grain structures. Furthermore, the process may entail as few as two forging steps, corresponding to the nonfinal and subsequent forging steps described above, or may further comprise additional forging steps, for example, a preliminary forging step performed on the preform at a strain rate that is higher than the final strain rate and performed at a subsolvus temperature that is lower than the final subsolvus temperature.

Other aspects of the invention include components formed by processes comprising the steps described above.

A technical effect of the invention is the ability to produce a component having two or more regions with different properties, including different grains sizes so that the different regions of the component can have grain sizes that promote different properties. In terms of a turbine disk, the process can produce a disk to have finer grains in the bore and coarser grains in the rim, enabling the properties of the rim and bore to be tailored or otherwise better adapted for the different operating conditions of the rim and bore. The process of this invention can potentially be applied to a wide variety of alloys to achieve different grain sizes and structures within different regions of a component.

Other aspects and advantages of this invention will be better appreciated from the following detailed description.

DETAILED DESCRIPTION OF THE INVENTION

Figure 1:
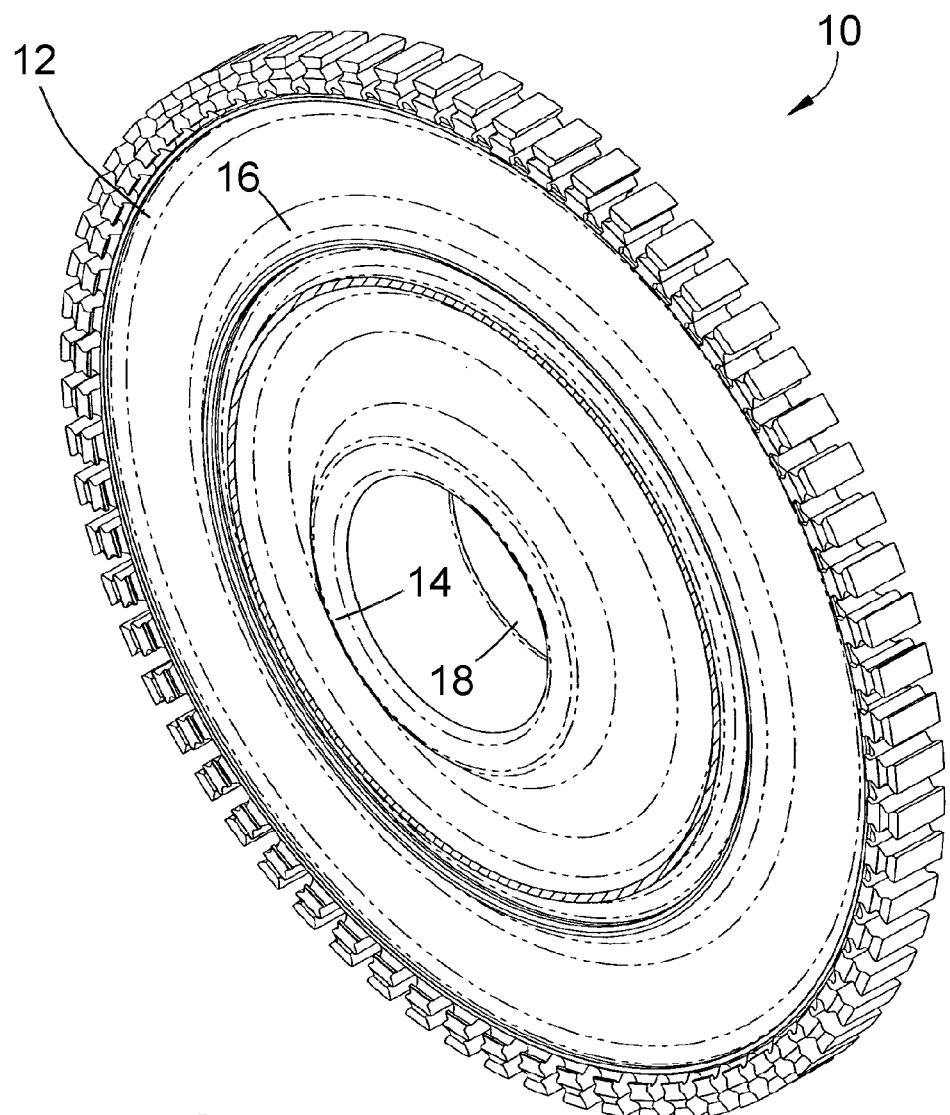
FIG. 1 is a perspective view of a turbine disk of a type used in gas turbine engines.

The present invention will be described with reference to rotating hardware of the type used in turbomachines, and particularly turbine and compressor disks and compressor spools of high-bypass gas turbine engines. However, though it should be understood that the teachings and benefits of the invention are not limited to such hardware, and instead can be adapted and applied to hardware used in a wide range of applications. For convenience, the invention will be described in particular reference to the turbine disk 10 represented FIG. 1, though it should be understood that the teachings and benefits of the invention are not limited to this particular disk 10.

In preferred embodiments of the invention, the rim 12, bore 14 and web 16 are all formed of the same alloy. Preferred alloys are strengthened with a precipitation phase that can be solutioned during processing of the alloys. In the context of forming the turbine disk 10, preferred alloys are gamma prime precipitation-strengthened nickel-base alloys, and particular alloys can be chosen on the basis of the operating conditions to which the final product will be subjected. Nonlimiting examples of suitable materials include the aforementioned gamma prime nickel-base superalloys R88DT, R95 and R104, as well as certain nickel-base superalloys commercially available under the trademarks Inconel®, Nimonic®, and Udimet®.

The invention involves using forging processes that will be described as incremental forging processes, in that the processes comprise multiple individual forging steps that are performed at different conditions to work selected regions of a forging formed of gamma prime nickel-base superalloy. According to a preferred aspect of the invention, the individual forging steps are carried out at a subsolvus temperature of the alloy in a manner that generates different grain sizes in different locations of the final product, with grain sizes in specific locations being tailored for the service conditions at those locations. Using the disk 10 of FIG. 1 as an example, a preform can be initially forged at relatively high strain rates and relatively low temperatures to generate a fine-grained structure within at least a region of the forged preform that will later define the bore 14 of the disk 10, such that the fine-grained structure promotes a desired low cycle fatigue (LCF) capability for the bore 14. A limited portion of the forged preform then undergoes forging at a higher temperature and a lower strain rate to generate a coarser grain structure within a region of the forged preform that will later define the rim 12 of the disk 10, such that the coarse-grained structure promotes creep and high temperature dwell properties desired for the rim 12. In this manner, the invention is capable of generating location-specific grain structures in a forging, which leads to location-specific properties in the forging. As such, processes of this invention can be used to manufacture hardware with a tailored location-specific microstructures to increase local capabilities within the hardware, for example, consistent with the local engine-operating environment in a compressor or turbine disk. Additional potential benefits include improved hardware configurations with increased temperature capability and cyclic life, which can promote the operating characteristics of machines in which the hardware is installed, such as the fuel efficiency of a gas turbine engine.

Figure 2:
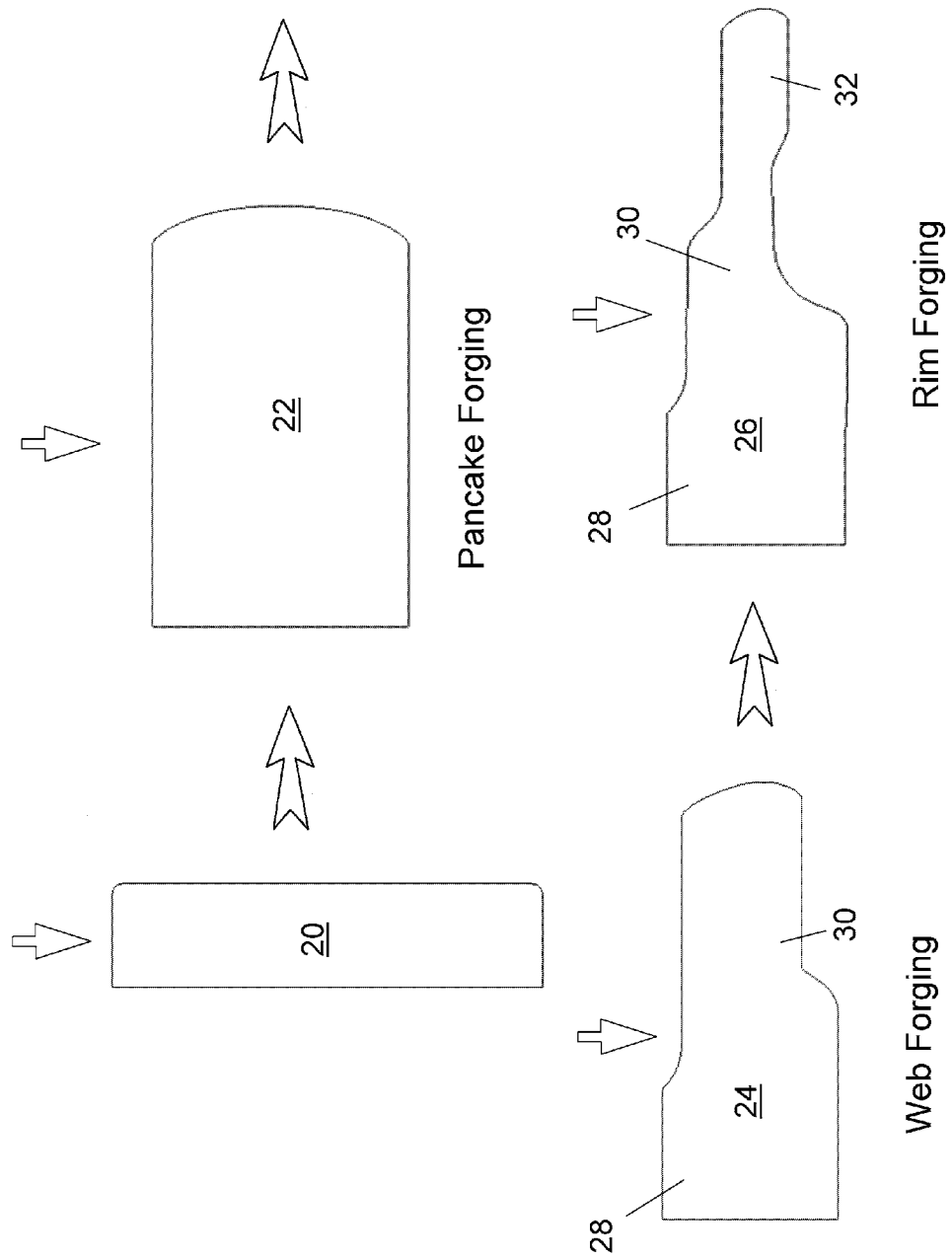
FIG. 2 schematically represents steps performed in the fabrication of a dual-property turbine disk in accordance with an embodiment of the present invention.

FIG. 2 represents a first incremental forging process that entails at least three forging steps to fabricate a disk of the type represented in FIG. 1. At least one of the forging steps is preferably an isothermal forging process. The processing steps of FIG. 2 begin with a preform 20 of any suitable shape and size for the disk 10. It should be appreciated that, because of the axisymmetric configuration of the disk 10, there is a diametrically opposite portion of the preform 20 that is not shown in FIG. 2, as well as diametrically opposite portions that are also not shown for subsequent forged profiles 22, 24 and 26 seen in FIG. 2. The preform 20 can be produced by a variety of known processes, including billets produced by powder metallurgy (P/M), conventional cast and wrought processing, and spraycast or nucleated casting forming techniques. The preform 20 preferably has an average grain size of about ASTM 10 or finer. The first forging step, represented in FIG. 2 by an arrow directed axially toward the preform 20, may be described as a preliminary forging step that produces the profile 22, whose generally flat shape can be referred to as a pancake forging. The next forging step, represented in FIG. 2 by an arrow directed axially toward the profile 22, may be described as a nonfinal forging step that produces the profile 24 whose shape includes portions 28 and 30 that correspond to the bore 14 and web 16, respectively, of the disk 10, and is referred to as a web forging. The third forging step, represented in FIG. 2 by an arrow directed axially toward the profile 24, may be described as a final forging step that produces the final profile 26 whose shape further includes a portion 32 that corresponds to the rim 12 of the disk 10, and is referred to as a rim forging. Following completion of the subsolvus incremental forging process of FIG. 2, the forging profile 26 preferably undergoes a final heat treatment, which can be used to cause or promote the generation of different grain sizes in different locations of the disk 10. In particular embodiments of the invention, the final heat treatment is preferably a supersolvus heat treatment to dissolve the gamma prime precipitates and cause recrystallization and grain growth that occurs as a result of plastic strain retained within the forging 26 from the preceding forging steps. The heat treatment is followed by cooling, during which a desired volume fraction of gamma prime precipitates form. Further details of the forging steps of FIG. 2 are discussed below.

It is well known in the art that many nickel-base superalloys have preferred strain rate regimes to achieve desired supersolvus grain growth behavior. Adjustment of the geometries of the preform 20 and profiles 22, 24 and 26, along with forging process control, may be used to achieve strain and strain rate profiles locally within the bore, web and rim portions 28, 30 and 32 of the profiles 22, 24 and 26. As previously discussed, a preferred aspect of the invention is to produce the disk 10 to obtain a finer grain structure in the bore 14 and a coarser grain structure in the rim 12. During the first forging step that produces the profile 22, the preform 20 is forged at a subsolvus temperature of the alloy and to achieve a strain level and strain rates that will promote the formation of finer grains within the bore portion 28 of the profiles 24 and 26 and, eventually, the bore 14 of the disk 10. For nickel-base alloys such as the aforementioned gamma prime nickel-base superalloys R88DT, R95 and R104, a suitable subsolvus temperature for the first forging step is about 25° C. to about 150° C. below the solvus temperature of the alloy. The strain level in the preform 20 is at least 50%, more preferably about 70% to about 250% to induce sufficient retained plastic strain to cause recrystallization and grain growth during heat treatment. In addition, the strain rates are at least 0.008 $s^{-1}$, more preferably about 0.01 $s^{-1}$ to about 0.32 $s^{-1}$. Using the nickel-base superalloy R104 as an example (typical gamma prime solvus temperature of about 2110° F. to about 2125° F. (about 1155° C. to about 1165° C.)), a suitable subsolvus temperature is about 1925° F. (about 1050° C.).

During the second forging step that produces the profile 24, the profile 22 is forged at a subsolvus temperature and at a strain level and strain rates that will further promote the formation of, or at least maintain, the finer grains within the bore portion 28 of the profiles 24 and 26 and, eventually, the bore 14 of the disk 10. A subsolvus temperature that may be the same, higher or lower than the subsolvus temperature used in the first forging step can be used in this forging step, which forms the bore and web portions 28 and 30. The strain rate used in this forging step can also be the same, higher or lower than the strain rate used in the first forging step. However, in certain embodiments of the invention, a lower strain rate is desired during this forging step to promote the formation of finer grains within the bore portion 28 of the profile 24. Preferred strain rates are at least 0.008 $s^{-1}$, and more preferably about 0.01 $s^{-1}$ to about 0.1 $s^{-1}$. The strain level in the preform 22 is again at least 50%, though more preferably about 70% to about 200%.

During the final forging step represented in FIG. 2, the profile 24 is forged at a subsolvus temperature to achieve a strain level and strain rates that will not degrade and preferably retain the finer grains already present within the bore portion 28 of the profile 24, while also promoting the formation of coarser grains within the rim portion 32 of the profile 26 and, eventually, the rim 12 of the disk 10. At least one of the strain rate and temperature used in the final forging step is higher or lower than the strain rate or temperature used in the prior steps. However, in particular embodiments of the invention, the final forging step, represented as forming the rim portion 32, is performed at a higher subsolvus temperature and to achieve lower strain rates than used in the first and second forging steps. As with the first and second forging steps, the final forging step is performed at a subsolvus temperature of about 25° C. to about 150° C. below the solvus temperature of the alloy, though at a higher temperature than whatever forging temperatures had been used in the two previous forging steps. A more preferred range for the subsolvus temperature of the final forging step is believed to be about 25° C. to about 65° C. below the solvus temperature of the alloy. Again using the R104 alloy as an example, a suitable subsolvus temperature for the third forging step is about 2050° F. (about 1120° C.). Preferred strain rates are at most about 0.004 $s^{-1}$, and more preferably at most 0.001 $s^{-1}$. Again, the strain level in the preform 24 is at least 50%, more preferably about 70% to about 250%. The lower strain rate of the final forging step causes the retained plastic strains to be released/relaxed, with the result that the profile has a coarser microstructure.

After the completion of the forging steps represented in FIG. 2, the final profile 26 undergoes a final heat treatment to cause or promote the generation of different grain sizes in different locations of the disk 10. As previously mentioned, in certain embodiments of the invention, for example, if the alloy is a precipitation-strengthened alloy such as R88DT, R95 or R104, the final heat treatment is preferably performed at a supersolvus (solution) heat treatment temperature, in other words, at a temperature higher than the solvus temperature of the alloy. During the supersolvus heat treatment, the gamma prime precipitates within the profile 26 dissolve, which permits recrystallization and grain growth to occur. Thereafter, the profile 26 can be cooled by a process that includes an appropriate aging treatment at a subsolvus temperature to reprecipitate the gamma prime phase. Both of these heat treatments can be performed to achieve (or at least with the intent to achieve) a substantially uniform temperature throughout the entire profile 26, as opposed to an intentional use of a differential heat treatment or differential cooling rates in which the bore and rim portions 28 and 32 are subjected to different temperatures.

Following the above-noted thermal treatments, and as a result of the incremental forging process described above, the bore portion 28 of the profile 26 has a fine-grained microstructure (for example, ASTM 7 or smaller) that promotes its tensile strength, burst strength, and LCF resistance, and the rim portion 32 has a coarser grain size (for example, ASTM 6 or larger) that promotes its creep, stress-rupture, and crack growth resistance, for example, DFCGR. Preferably, the grain size within the bore portion 28 is ASTM 9 or finer, and the grain size within the rim portion 32 is ASTM 3 or coarser. The grain size within the web portion 30 will generally exhibit a substantially uniform transition from the finer grain size of the bore portion 28 to the coarser grain size of the rim portion 32.

Figure 3:
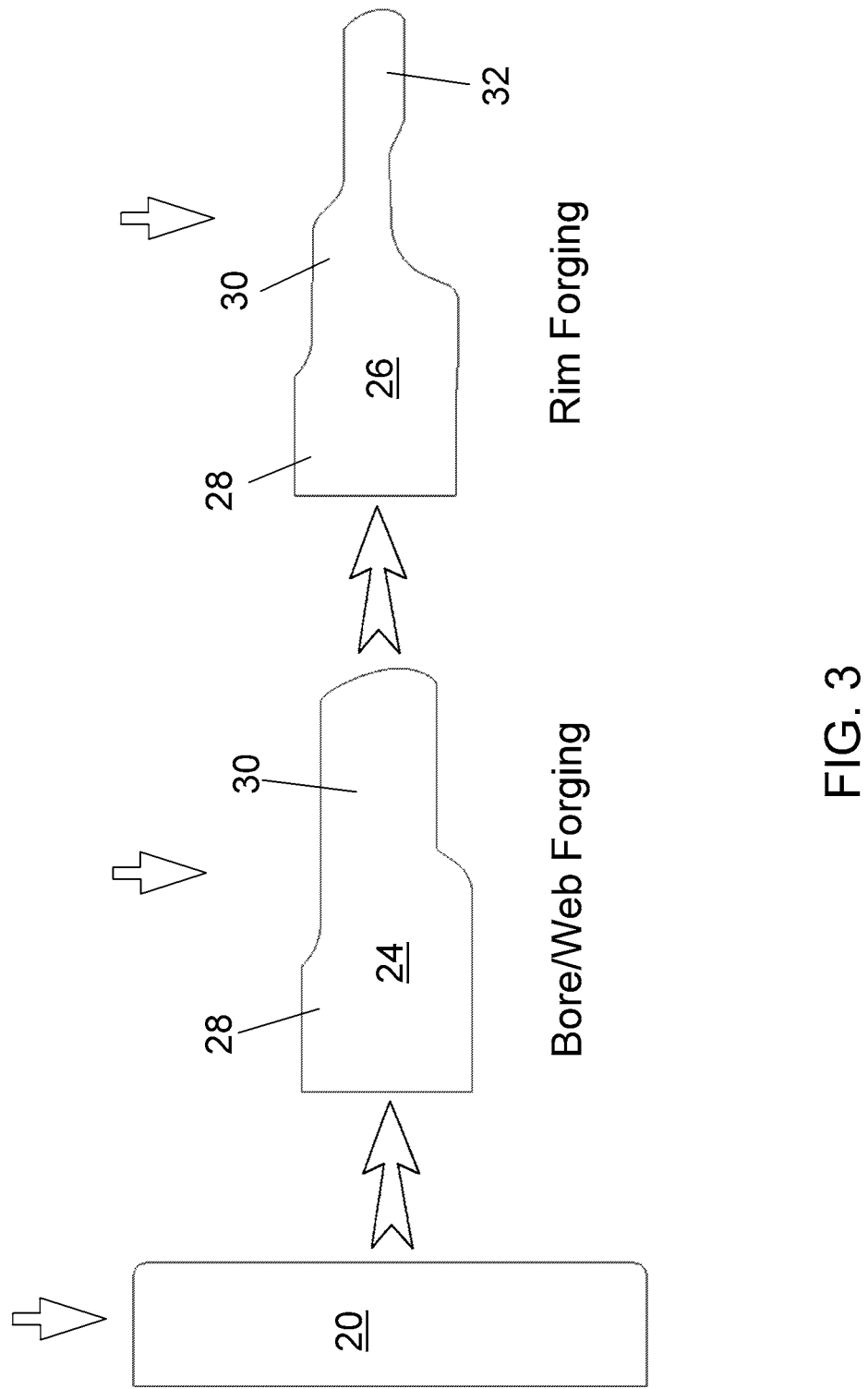
FIG. 3 schematically represents steps performed in the fabrication of a dual-property turbine disk in accordance with another embodiment of the present invention.

FIG. 3 represents a second incremental forging process that is similar in some respects to the process of FIG. 2, but with which preferred aspects of the invention can be achieved using only two forging steps. In view of similarities between the embodiments of FIGS. 2 and 3, the following discussion of FIG. 3 will focus primarily on aspects of the second embodiment that differ from the first embodiment in some notable or significant manner. Other aspects of the second embodiment not discussed in any detail can be, in terms of structure, materials, process, etc., essentially as was described for the first embodiment.

Similar to FIG. 2, the processing steps of FIG. 3 begin with the preform 20 as described for FIG. 2. The first forging step, represented in FIG. 3 by an arrow directed axially toward the preform 20, produces a profile whose outline resembles that of the profile 24 of FIG. 2, including its bore and web portions 28 and 30 that correspond to the bore 14 and web 16, respectively, of the disk 10. As such, this profile is also identified by reference number 24 in FIG. 3, but is referred to as a bore/web forging. The second forging step, represented in FIG. 3 by an arrow directed axially toward the profile 24, may be described as a final forging step that produces the final profile 26, referred to as a rim forging. As with the embodiment of FIG. 2, the shape of the profile 26 further includes the rim portion 32, corresponding to the rim 12 of the disk 10.

As with the embodiment of FIG. 2, the intent of the incremental forging process of FIG. 3 is to produce the disk 10 to have a finer grain structure in the bore 14 and a coarser grain structure in the rim 12. During the first forging step that produces the profile 24, the preform 20 is forged at a subsolvus temperature of the alloy and to achieve a strain level and strain rates that will promote the formation of finer grains within the bore and web portions 28 and 30 of the profiles 24 and 26 and, eventually, the bore 14 and web 16 of the disk 10. The same subsolvus temperature, strain level, and strain rates identified for the first forging step of FIG. 2 can be used in this first forging step of FIG. 3, which forms the bore and web portions 28 and 30 of the profile 24. Furthermore, the same subsolvus temperature, strain level, and strain rates identified for the last forging step of FIG. 2 can be used in the last forging step of FIG. 3, which forms the rim portion 32 of the profile 26. As such, at least one of the strain rate and temperature used in the final forging step of FIG. 3 is either higher or lower than the strain rate or temperature used in the previous step. However, in particular embodiments of the invention, the final forging step of FIG. 3 is performed at a higher subsolvus temperature and to achieve lower strain rates than used in the first forging step of FIG. 3. After the completion of the forging steps represented in FIG. 3, the final profile 26 can be heat treated in the same manner as that described for the profile 26 produced by the process of FIG. 2. As before, the grain size within the bore portion 28 is preferably ASTM 9 or finer, and the grain size within the rim portion 32 is preferably ASTM 3 or coarser. The grain size within the web portion 30 will generally exhibit a substantially uniform transition from the finer grain size of the bore portion 28 to the coarser grain size of the rim portion 32. As such, there is no intended grain size difference between the different processes of FIGS. 2 and 3.

In an investigation leading to the present invention, disks were produced by each of the processes represented in FIGS. 2 and 3. The disks were produced from the R104 alloy (estimated gamma prime solvus temperature of about 1155° C. to about 1165° C.). Forging conditions for the processes represented in FIGS. 2 and 3 are summarized below in Tables I and II, respectively.

TABLE I

| Forging Step | Temp. (° C.) | Strain Rate (s$^{-1}$) |
| --- | --- | --- |
| #1 | 1052 | 0.032 |
| #2 | 1052 | 0.032 |
| #3 | 1121 | 0.001 |

TABLE II

| Forging Step | Temp. (° C.) | Strain Rate (s$^{-1}$) |
| --- | --- | --- |
| #1 | 1052 | 0.032 |
| #2 | 1121 | 0.001 |

The result of the process steps of Table I was a disk having a fine-grained bore portion with an average grain size of ASTM 9 and finer, and a coarser-grained rim portion having an average grain size of ASTM 3 and coarser. The result of the process steps of Table II was a disk having essentially the same fine-grained and coarse-grained microstructures in its bore and rim portion as obtained for the disk produced by the process steps of Table I. These grain sizes would be advantageous in that the resulting bores would have high yield strengths for resistance to burst, whereas the rims would be resistant to crack growth rates.

From the above, it should be evident that benefits associated with the processes described above can be achieved with monolithic forgings produced from monolithic preforms, in other words, forgings and preforms that are not formed by assembling individual subcomponents that may have different chemistries. However, it is also within the scope of the invention that one or more joining techniques could be incorporated into one of the processes described above for fabricating the disk 10. For example, separate preforms could be produced for the rim, bore and/or web, which then undergo a joining process, such as inertia welding or forge-enhanced bonding, to yield a profile having rim, bore and web portions joined by one or more solid-state joints, which then undergoes one of the forging processes described above. However, a notable advantage of the present invention is the ability to manufacture disk configurations that may be difficult or impossible to produce with solid-state joining techniques such as inertia welding or forge-enhanced bonding processes.

Another benefit associated with the process described above is the ability to achieve a significant grain size in distinct regions of a monolithic part without resorting to complicated differential heat treatment processes. However, such differential heat treatment methods could be applied to such a component, either to effect a greater microstructural difference between the differentially forged regions or to create distinct microstructures within one of the regions.

While the invention has been described in terms of specific embodiments, it is apparent that other forms could be adopted by one skilled in the art. Therefore, the scope of the invention is to be limited only by the following claims.

The invention claimed is:

1. A process of fabricating a component having at least first and second regions with different grain structures, the process comprising:
   performing at least one forging step on a preform to produce a nonfinal profile having at least a first portion corresponding to the first region of the component and having a separate second portion, the preform being formed of a precipitation-strengthened alloy having a solvus temperature at which precipitates of the alloy enter into solid solution, the at least one forging step comprising a nonfinal forging step performed at a first strain rate and at a first subsolvus temperature that is below the solvus temperature of the alloy;
   performing a subsequent forging step on the second portion of the nonfinal profile to produce a final profile comprising the first portion of the nonfinal profile as formed by the at least one forging step and further comprising a second portion forged from the second portion of the nonfinal profile and corresponding to the second region of the component, the subsequent forging step being performed at a subsequent strain rate and at a subsequent subsolvus temperature, wherein at least one of the subsequent strain rate and subsequent subsolvus temperature is either higher or lower than the first strain rate or first subsolvus temperature; and then
   performing a heat treatment on the final profile to cause grain growth in the final profile, wherein the first portion of the final profile has a different grain size than the second portion of the final profile as a result of the first strain rate being different than the subsequent strain rate and/or the first subsolvus temperature being different than the subsequent subsolvus temperature.

2. The process according to claim 1, wherein the alloy is a nickel-base alloy and the precipitates are gamma prime precipitates.

3. The process according to claim 2, wherein the first strain rate is higher than the subsequent strain rate and the subsequent subsolvus temperature is higher than the first subsolvus temperature.

4. The process according to claim 2, wherein the subsequent strain rate is higher than the first strain rate.

5. The process according to claim 1, wherein the first subsolvus temperature is higher than the subsequent subsolvus temperature.

6. The process according to claim 1, wherein the first strain rate is higher than the subsequent strain rate and the subsequent subsolvus temperature is higher than the first subsolvus temperature.

7. The process according to claim 1, wherein the at least one forging step further comprises a preliminary forging step performed on the preform prior to the nonfinal forging step to produce a preliminary profile on which the nonfinal forging step is performed, the preliminary forging step being performed at a preliminary strain rate that is higher than the first and subsequent strain rates and performed at a preliminary subsolvus temperature that is below the solvus temperature of the alloy and below the subsequent subsolvus temperature.

8. The process according to claim 1, wherein the component is a rotating component of a gas turbine engine, and the first and second regions of the component comprise a bore and a rim, respectively, of the component.

9. The process according to claim 8, wherein the bore has an average grain size of ASTM 7 or smaller and the rim has an average grain size of ASTM 6 or larger.

10. The process according to claim 1, wherein at least one of the forging steps is performed using an isothermal forging process.

11. The process according to claim 1, further comprising joining the preform or the nonfinal profile to a portion corresponding to a third region of the component.

12. The process according to claim 1, further comprising joining the final profile to a third region of the component.

13. A process of fabricating a rotating component of a gas turbine engine having a bore and a rim with different grain structures, the process comprising:
   performing a first forging step on a preform to produce a first profile, the preform being formed of a precipitation-strengthened nickel-base alloy having a solvus temperature at which gamma prime precipitates of the alloy enter into solid solution, the first forging step being performed at a first strain rate and at a first subsolvus temperature that is below the solvus temperature of the alloy;
   performing a second forging step on the first profile to produce a second profile having at least a first portion corresponding to the bore of the component and having a separate second portion, the second forging step being performed at a second strain rate that is lower than the first strain rate and performed at a second subsolvus temperature that is below the solvus temperature of the alloy;
   performing a final forging step on the second portion of the second profile to produce a final profile comprising the first portion of the second profile as formed by the second forging step and further comprising a second portion forged from the second portion of the second profile and corresponding to the rim of the component, the final forging step being performed at a third strain rate that is lower than the first and second strain rates and performed at a third solvus temperature that is below the solvus temperature of the alloy but higher than the first and second subsolvus temperatures; and then
   performing a supersolvus heat treatment on the final profile to cause grain growth in the final profile, wherein the first portion of the final profile has a finer-grained microstructure than the second portion of the final profile as a result of the first and second strain rates being higher than the third strain rate and the first and second solvus temperatures being lower than the third solvus temperature.

14. The process according to claim 13, wherein the first, second and third subsolvus temperatures are about 25° C. to about 150° C. below the solvus temperature of the alloy.

15. The process according to claim 14, wherein the third subsolvus temperature is about 25° C. to about 65° C. below the solvus temperature of the alloy.

16. The process according to claim 13, wherein the component is a turbine or compressor disk, the bore has an average grain size of ASTM 9 or smaller, and the rim has an average grain size of ASTM 3 or larger.

17. A process of fabricating a rotating component of a gas turbine engine having a bore and a rim with different grain structures, the process comprising:

performing a first forging step on a preform to produce a first profile having at least a first portion corresponding to the bore of the component and having a separate second portion, the preform being formed of a precipitation-strengthened nickel-base alloy having a solvus temperature at which gamma prime precipitates of the alloy enter into solid solution, the first forging step being performed at a first strain rate and at a first subsolvus temperature that is below the solvus temperature of the alloy;

performing a final forging step on the second portion of the first profile to produce a final profile comprising the first portion of the first profile as formed by the first forging step and further comprising a second portion forged from the second portion of the first profile and corresponding to the rim of the component, the final forging step being performed at a final strain rate that is lower than the first strain rate and performed at a final solvus temperature that is below the solvus temperature of the alloy but higher than the first subsolvus temperature; and then performing a supersolvus heat treatment on the final profile to cause grain growth in the final profile, wherein the first portion of the final profile has a finer-grained microstructure than the second portion of the final profile as a result of the first strain rate being higher than the final strain rate and the first subsolvus temperature being lower than the final solvus temperature.

18. The process according to claim 17, wherein the first and final subsolvus temperatures are about 25° C. to about 150° C. below the solvus temperature of the alloy.

19. The process according to claim 18, wherein the final subsolvus temperature is about 25° C. to about 65° C. below the solvus temperature of the alloy.

20. The process according to claim 17, wherein the component is a turbine or compressor disk, the bore has an average grain size of ASTM 9 or smaller, and the rim has an average grain size of ASTM 3 or larger.

* * * * *